United States Patent
Flynn et al.

[11] Patent Number: 6,038,888
[45] Date of Patent: Mar. 21, 2000

[54] APPARATUS FOR DELIVERING GLASS GOBS IN A GLASS FORMING MACHINES

[75] Inventors: Robin L. Flynn; Dan M. Hayes, both of Waterville; George A. Nickey, Maumee, all of Ohio

[73] Assignee: Owens-Brockway Glass Container Inc., Toledo, Ohio

[21] Appl. No.: 08/937,743

[22] Filed: Sep. 25, 1997

[51] Int. Cl.[7] .............................. C03B 9/40; C03B 13/16
[52] U.S. Cl. .......................... 65/304; 65/323; 65/374.15; 193/2 R; 414/224
[58] Field of Search ............................ 65/126, 127, 122, 65/225, 303, 304, 323, 355, 374.12, 374.15, 17.1, 374.11, 374.1; 193/1, 2 R, 33, 34, 41; 414/224, 223

[56] References Cited

U.S. PATENT DOCUMENTS

| | | |
|---|---|---|
| Re. 15,600 | 5/1923 | Lorenz . |
| Re. 28,073 | 7/1974 | Trudeau . |
| 596,897 | 1/1898 | May . |
| 1,264,328 | 4/1918 | Peiler . |
| 1,331,536 | 2/1920 | Soubier . |
| 1,505,537 | 8/1924 | Brookfield . |
| 1,573,273 | 2/1926 | Pleukharp . |
| 1,638,593 | 8/1927 | Mullholland . |
| 2,038,519 | 4/1936 | Barnard . |
| 2,162,800 | 6/1939 | Crimmel . |
| 2,388,876 | 11/1945 | Smith . |
| 2,637,429 | 5/1953 | Pond . |
| 2,669,805 | 2/1954 | Rowe . |
| 2,758,421 | 8/1956 | Smith . |
| 2,859,559 | 11/1958 | Mumford . |
| 2,873,555 | 2/1959 | Conrad . |
| 2,910,806 | 11/1959 | Russell et al. . |
| 3,198,616 | 8/1965 | Havens . |
| 3,341,315 | 9/1967 | Patschorke . |
| 3,732,086 | 5/1973 | Heyne . |
| 3,857,691 | 12/1974 | Jones et al. . |
| 4,339,263 | 7/1982 | Martin . |
| 4,772,306 | 9/1988 | Davey et al. . |
| 5,213,602 | 5/1993 | Foster et al. . |
| 5,298,049 | 3/1994 | Meyer . |
| 5,429,652 | 7/1995 | Sano et al. . |
| 5,511,593 | 4/1996 | Sweetland . |
| 5,599,370 | 2/1997 | Struckmeier et al. . |

FOREIGN PATENT DOCUMENTS

| | | | |
|---|---|---|---|
| WO 92/20631 | 11/1992 | WIPO | 65/304 |

*Primary Examiner*—Stanley S. Silverman
*Assistant Examiner*—Jacqueline A. Ruller

[57] ABSTRACT

A glass gob delivery system for conveying gobs of molten glass from an oscillating gob delivery chute to a blank mold of a glass container forming machine of the I.S. type. The delivery system comprises an elongate trough that extends downwardly from an inlet to an outlet and a deflector with an inlet near the outlet from the trough and an outlet near the blank mold. The trough has a cross-section in the form of an upwardly facing U whose opposed legs extend parallel or substantially parallel to one another, the spacing between the opposed legs tapering gradually from a greater spacing at the inlet to a lesser spacing at the outlet. The deflector has a curved portion that curves downwardly from a higher elevation at a location near the inlet to a lower elevation at a location away from the inlet and has a cross-section in the shape of a downwardly facing U whose opposed legs extend parallel or substantially parallel to one another, the spacing between the opposed legs of the deflector gradually tapering from a greater spacing at the inlet to a lesser spacing at the outlet. The trough and the deflector are formed from an aluminum alloy with gob contacting surfaces that are coated with a nickel-graphite composition.

5 Claims, 7 Drawing Sheets

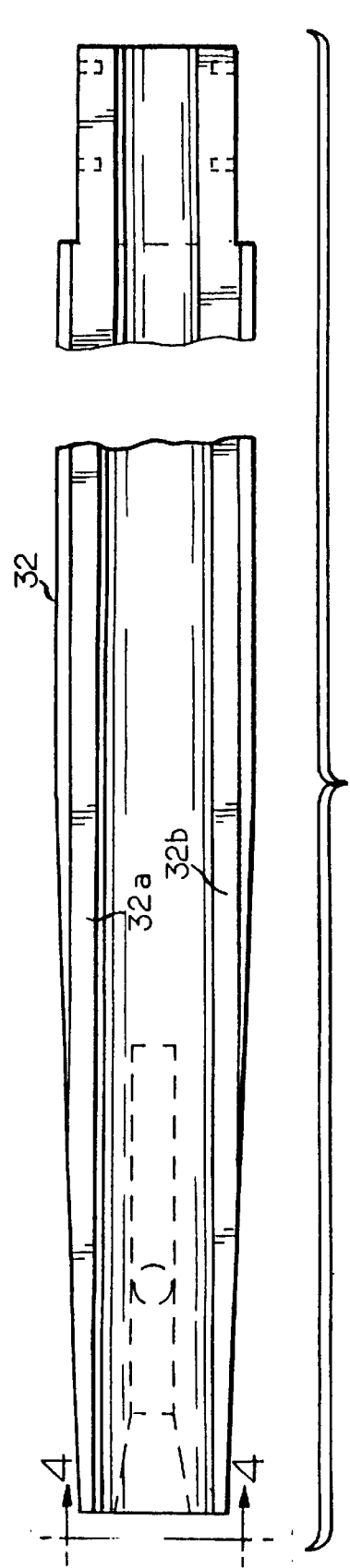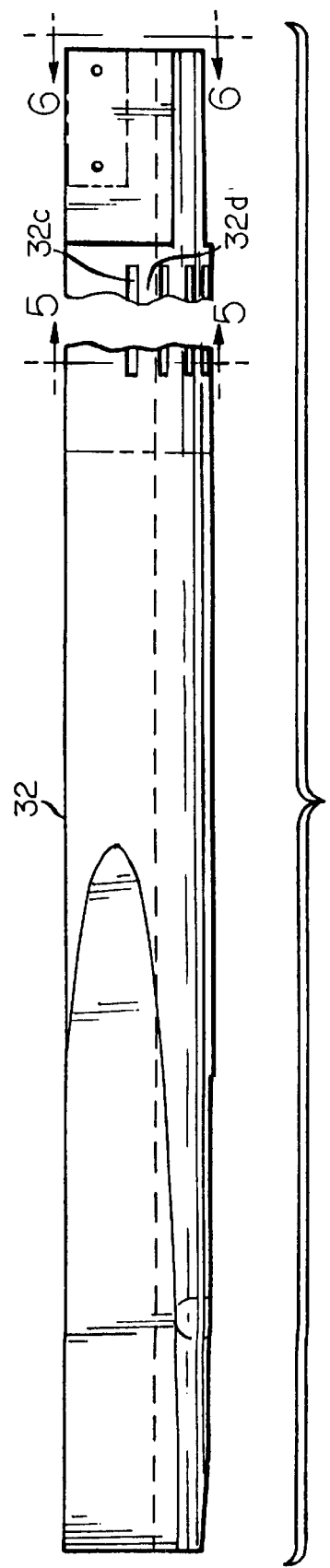
FIG.3
FIG.2

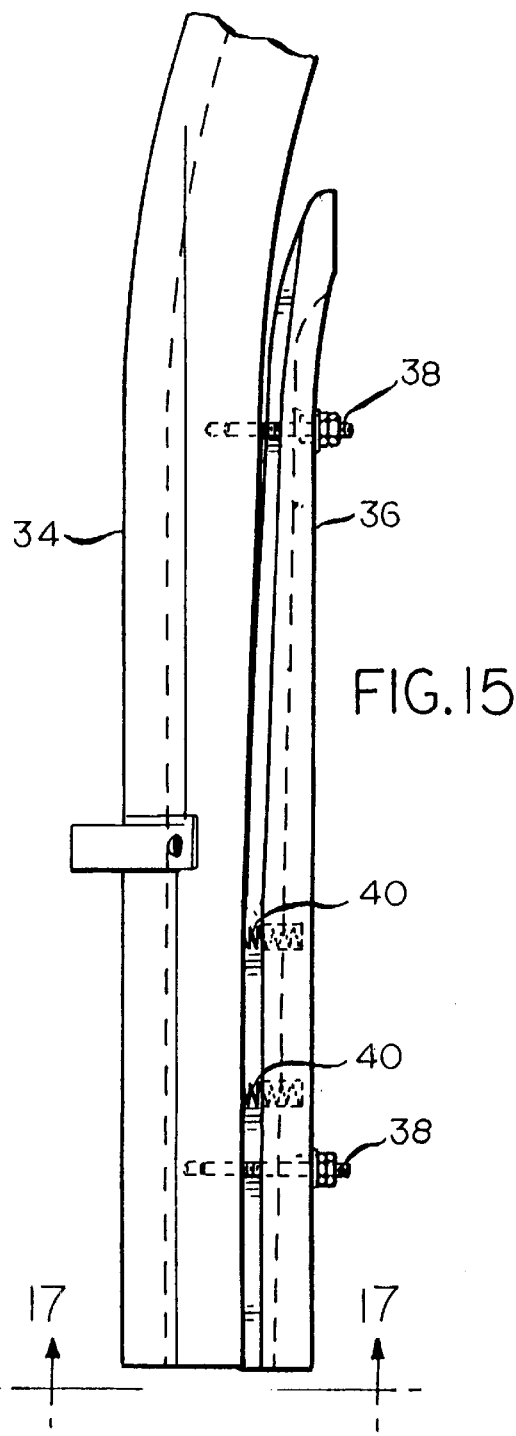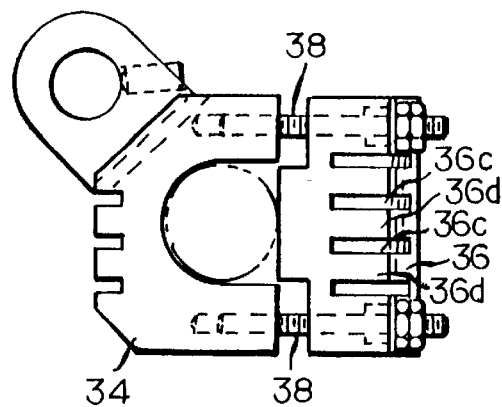

6,038,888

APPARATUS FOR DELIVERING GLASS GOBS IN A GLASS FORMING MACHINES

BACKGROUND OF THE INVENTION

1. Field of the Invention

This invention relates to fixed troughs and deflectors of the type used to convey gobs of molten glass from an oscillating chute of a gob distributor to a blank mold of an I.S. machine.

2. Description of the Prior Art

In the manufacture of glass containers by a machine of the I.S. type, gobs of molten glass are repetitively delivered to a fixed delivery system for each machine section by a chute of an oscillating gob distributor that oscillates between the delivery systems of the various sections of the I.S. machine, which are aligned side-by-side. Each gob delivery system includes an elongated, downwardly inclined trough, which typically has a cross-sectional configuration of an upwardly facing U whose sides taper outwardly with respect to one another, and an elongated, curved and downwardly inclined distributor, which typically has a cross-sectional configuration of a downwardly facing U whose sides taper outwardly with respect to one another. Typically, the sides of each trough have a 20° included angle therebetween, and the sides of the deflector have an included angle of 12° therebetween. U.S. Pat. No. 4,772,306 (Davey et al.), the disclosure of which is incorporated by reference herein, describes a prior art version of a glass gob delivery system of this general character.

Problems have been identified with prior art glass gob delivery devices as described above with respect to proper centering of the gob within the devices as the gob travels from the distributor to an I.S. machine section, specifically to a blank mold station thereof. The use of tapered sides in the trough and in the deflector is intended to assist in centering the gob within the trough and deflector prior to its introduction into the blank mold of the I.S. machine, but can also lead to some degree of "bobsledding" of a gob as it is enroute to the I.S. machine section blank mold. In this case the gob will not be properly centered and aligned with the blank mold as it enters an opening at the top of the blank mold (which corresponds to the bottom of a container to be formed from a parison formed in the blank mold because the parison is formed in the blank mold in an inverted orientation, as is known in the art). To deal with the problem of a gob entering a blank mold in a misaligned or miscentered condition it has been known to lubricate the interior of the blank mold by periodically swabbing it with a mold dopant substance, but this is a labor intensive practice, which is desirably eliminated whenever possible.

Another problem encountered with prior art glass gob delivery systems is that they have heretofore been formed from steel or cast iron, to be able to resist the thermal effects from contact with the molten gobs passing therethrough. Troughs and deflectors formed from an aluminum alloy would provide for better cooling of the items of the delivery equipment.

Another problem encountered with prior art glass gob delivery systems is that gobs can fall or partly fall from the deflectors thereof if they do not have sufficient velocity when they enter the curved, downwardly facing deflectors unless suitable covers are provided for such deflectors. However, such deflector covers tend to limit the size of the gobs passing through the deflector, thus necessitating frequent replacement of deflectors to accommodate gobs of different size when the molds of the I.S. machine are changed to produce containers of a different size.

SUMMARY OF THE INVENTION

According to the present invention, the aforesaid and other problems associated with prior art molten glass gob delivery troughs and deflectors are solved in troughs and deflectors built according to the present invention. Specifically, the problem of gob centering is overcome by providing a trough, and a deflector, whose generally U-shaped opening between its side walls is greater at or near its inlet than at or near its outlet, with a gradual taper from its maximum width to its minimum width. This eliminates the need for imparting an outwardly directed taper to its side walls, thus providing more of a true U-shape to the cross section of the trough and deflector, and thereby eliminates the gob bobsledding characteristics that can result when gobs pass through troughs and deflectors whose opposed sides taper outwardly with respect to one another.

The problem of proper control of gob cooling as it passes through a trough and a deflector of a gob delivery system according to the present invention is overcome by fabricating the trough and the deflector from an aluminum alloy to take full advantage of the superior thermal conductivity of aluminum alloys relative to cast iron and steel. The problem of the temperature limits of aluminum alloys, which has heretofore precluded their use in glass gob contacting devices, is overcome according to the present invention by thermally spray coating the glass gob contacting surfaces of such devices with a nickel-graphite composition.

Accordingly, it is an object of the present invention to provide an improved glass gob delivery trough. It is also an object of the present invention to provide an improved glass gob delivery deflector. More particularly, it is an object of the present invention to provide a glass gob delivery trough and a glass gob delivery deflector, in combination with one another, that deliver gobs of molten glass properly centered and properly aligned to a blank mold of an I.S. glass forming machine. It is also an object of the present invention to provide a glass gob delivery trough and a glass gob delivery deflector fabricated from an aluminum alloy to improve the cooling of the delivery equipment items, and thereby reduce friction between the gobs and the delivery equipment items to improve gob delivery times and consistency.

For a further understanding of the present invention and the objects thereof, attention is directed to the drawing and the following brief description thereof, to the detailed description of the preferred embodiment and to the appended claims.

IN THE DRAWING

FIG. 2 is a plan view, at an enlarged scale, of the trough of FIG. 1;

FIG. 3 is an elevational view of the trough of FIGS. 1 and 2;

FIG. 15 is a fragmentary elevational view of the deflector of FIG. 7 with a cover member in place;

FIG. 16 is a fragmentary plan view of the deflector of FIG. 15; and

FIG. 17 is an end view taken on line 17—17 of FIG. 15.

DETAILED DESCRIPTION OF THE PREFERRED EMBODIMENT

Figure 1:
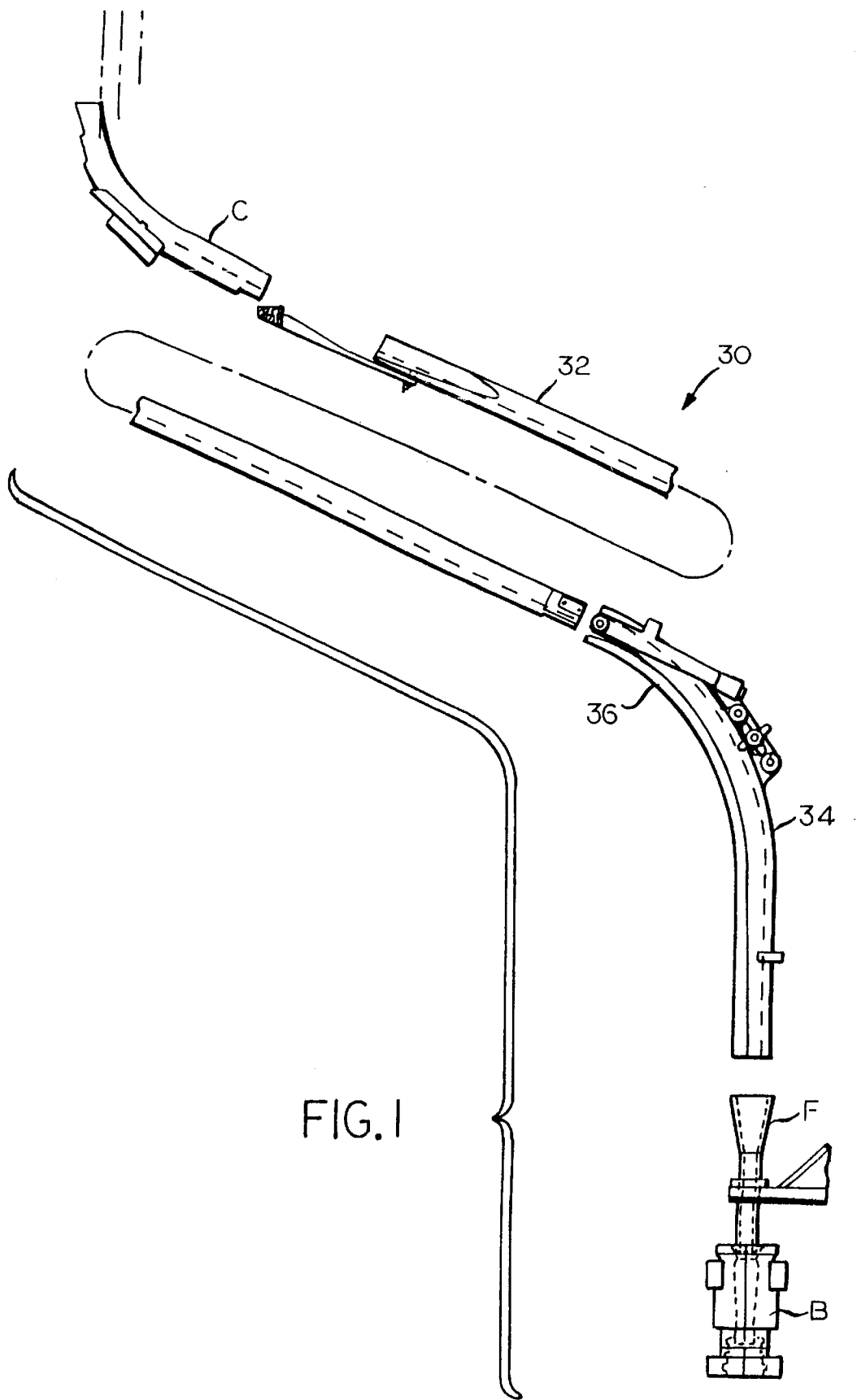
FIG. 1 is an elevational view of a glass gob delivery system incorporating a trough and a deflector according to preferred embodiments of the present invention.

A gob delivery system according to the preferred embodiment of the present invention is identified by reference numeral 30 in FIG. 1 and is used to serially deliver gobs of molten glass from an oscillating chute C to a blank mold B at a section of an I.S. glass forming machine, FIG. 1 showing an arrangement in which the gobs pass through a loading funnel F after leaving the gob delivery system 30 before entering the blank mold B. As is known in the art, a gob delivery system 30 will be provided for each blank mold B at each section of the I.S. machine, for example, three (3) like gob delivery systems 30 for a triple gob I.S. machine, that is, a machine that simultaneously forms three (3) containers at each I.S. machine section. Each gob delivery system 30 is fixed in position, though adjustably so, with respect to the chute that it receives glass gobs from, and each chute C oscillates in an indexing manner to deliver glass gobs to the gob delivery systems 30 for the various sections of an I.S. machine, typically eight (8) or ten (10) or even twelve (12) such sections aligned side-by-side. In any case, each gob delivery system is made up of an inclined trough 32, which receives glass gobs from the chute C, and a downwardly curved deflector 34, through which the glass gobs pass after leaving the trough 32.

Figure 4:
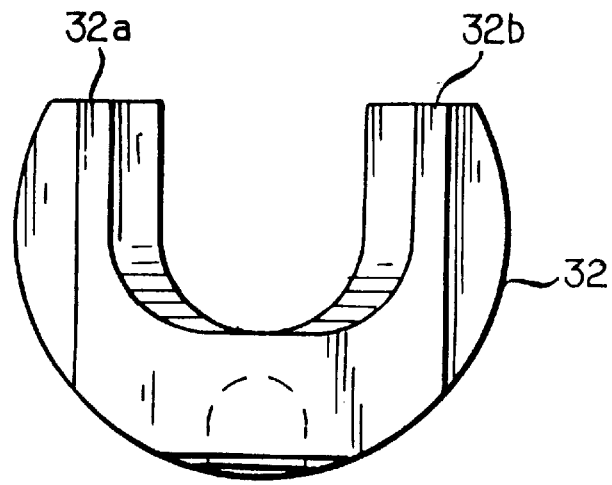
FIG. 4 is an end view taken on line 4—4 of FIG. 3.
Figure 5:
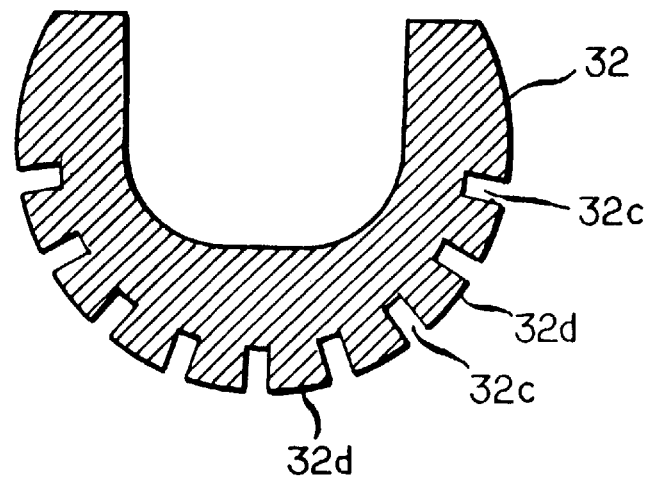
FIG. 5 is a sectional view taken on line 5—5 of FIG. 2.
Figure 6:
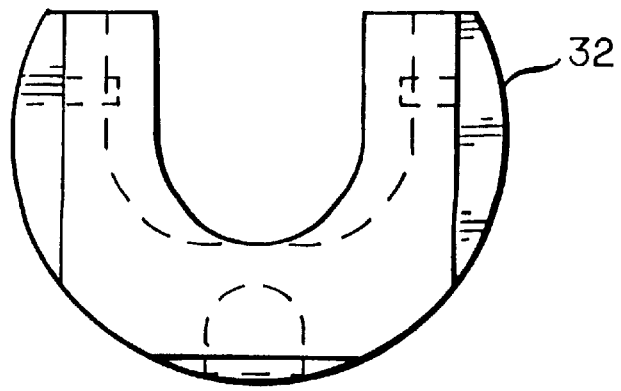
FIG. 6 is an end view taken on line 6—6 of FIG. 2.
Figure 7:
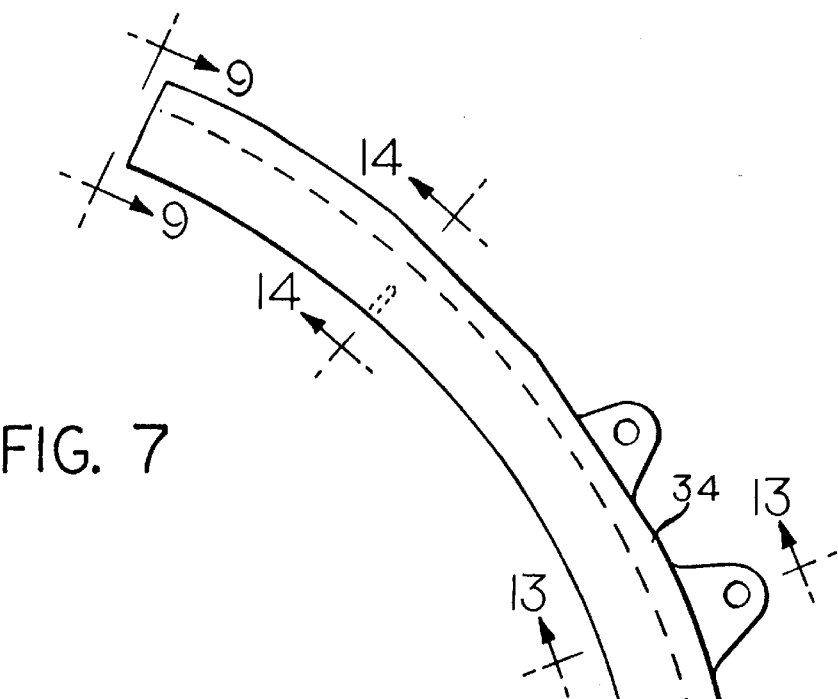
FIG. 7 is an elevational view, at an enlarged scale, of the deflector of FIG. 1 with a cover member omitted.
Figure 8:
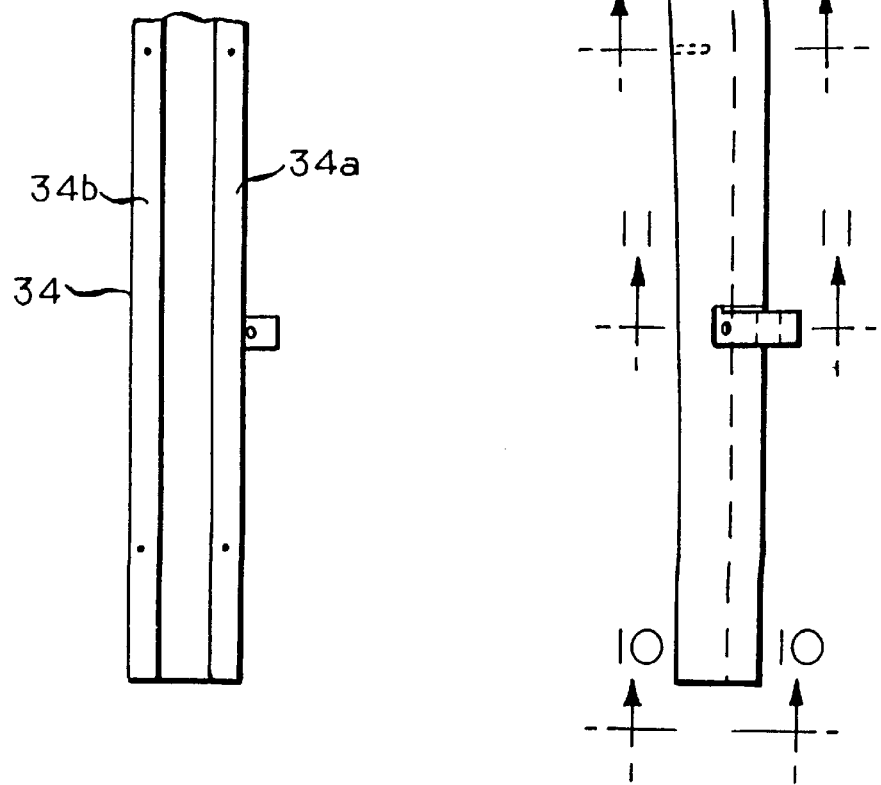
FIG. 8 is a fragmentary plan view of the deflector of FIG. 7.
Figure 9:
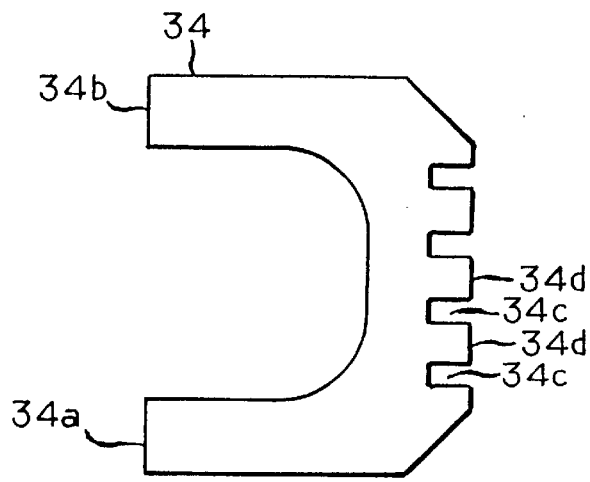
FIG. 9 is an end view, at an enlarged scale, taken on line 9—9 of FIG. 7.
Figure 11:
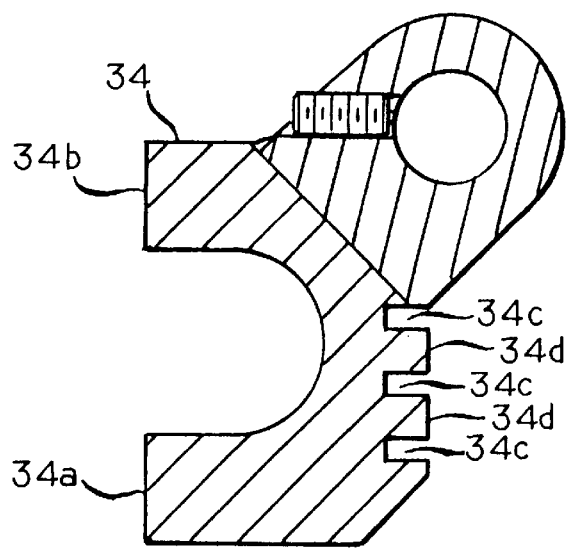
FIG. 11 is a sectional view, at an enlarged scale, taken on line 11—11 of FIG. 7.
Figure 10:
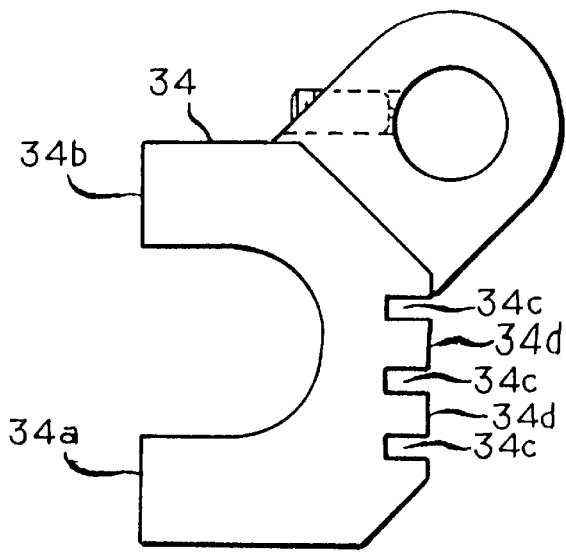
FIG. 10 is an end view, at an enlarged scale, taken on line 10—10 of FIG. 7.
Figure 14:
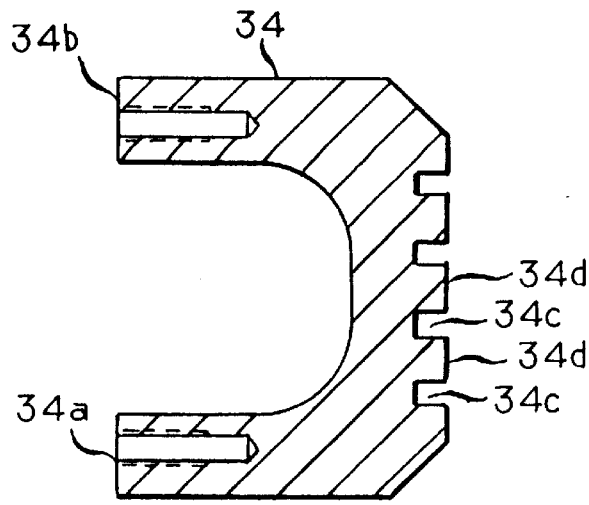
FIG. 14 is a sectional view, at an enlarged scale, taken on line 14—14 of FIG. 7.
Figure 13:
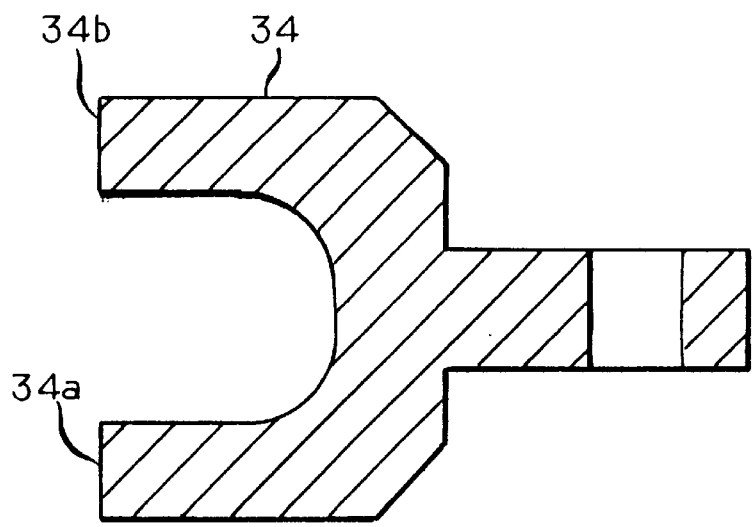
FIG. 13 is a sectional view, at an enlarged scale, taken on line 13—13 of FIG. 7.
Figure 12:
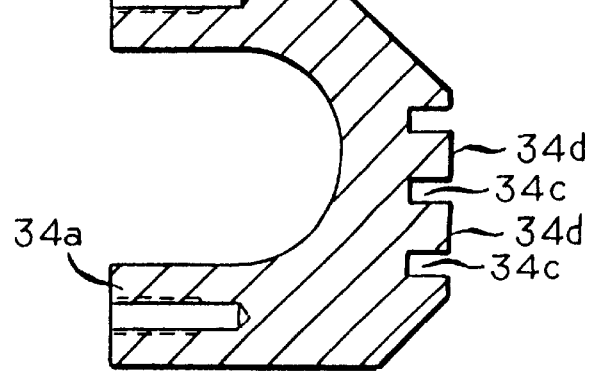
FIG. 12 is a sectional view, at an enlarged scale, taken on line 12—12 of FIG. 7.

As is clear from FIGS. 4–6, the trough 32 has a cross section of an upwardly facing U whose opposed sides, 32a, 32b, are parallel or substantially parallel to one another. The purpose of the parallel relationship between the sides 32a, 32b is to prevent glass gobs passing through the trough 32 from riding up the sides of the trough 32, in a manner similar to the side-to-side motion of a bobsled going down a bobsled run. To help center the glass gobs passing through the trough 32, the width of the interior space between the sides 32a, 32b gradually decreases as the trough 32 extends downwardly from the chute C, as will be clear from a comparison of FIGS. 4 and 6.

Heat transfer from the glass gobs occurs as they pass through the trough 32, and to that end the trough 32 is preferably formed from an aluminum alloy, which has very good thermal conductivity properties in comparison to the ferrous metals heretofore used in the manufacture of glass gob delivery troughs. Further, at least some finite longitudinal portion of the trough 32 may be provided with spaced apart longitudinally extending slots 32c to define spaced apart longitudinally extending cooling fins 32d, as is shown most clearly in FIG. 5, to thereby increase the cooling of the trough 32 and thereby reduce the coefficient of friction between the gobs and the trough to improve the delivery times and the delivery consistency of the gobs passing through the trough 32.

Heretofore, it has been believed that aluminum alloys were not sufficiently temperature resistant to be able to withstand repeated contact with glass gobs, whose temperatures may be of the order of 2,000° F. for soda-lime-silica glass compositions of the type used in producing most types of glass containers used in packaging applications. However, it has been found that aluminum alloys may be made suitable for use in the manufacture of glass gob delivery troughs if the gob contacting surfaces thereof, that is, the interior of the U-shaped opening thereof, are spray coated with an Ni—Gr (nickel graphite) composition, which will also desirably decrease the coefficient of friction between the glass gobs and the trough 32. It is also contemplated that a lubricant spray system (not shown) can be utilized to apply a lubricant to the glass gobs passing through the trough 32 and/or the deflector 34 as a way to avoid the need for periodically swabbing the interior of the blank mold B with a mold dope composition to the extent that such requirement is not otherwise eliminated by the use of a gob delivery system 30 according to the present invention.

The deflector 34, which is shown in FIG. 1 with a cover 36 secured thereto, is shown in FIGS. 7–14 without the cover 36 in place. The deflector 34 is curved, with an inlet end aligned with an outlet end of the trough 32 and an outlet end aligned with the central axes of the loading funnel F and the blank mold B. As is shown in FIGS. 8–14, the deflector 34 is U-shaped in cross-section, and faces downwardly in the portions of the deflector that extends generally horizontally and inwardly in the vertically extending portions thereof. The deflector 34 has opposed sides 34a, 34b that are parallel or substantially parallel to one another to prevent the glass gobs passing through the deflector 34 from riding up the sides, and the interior spacing between the sides 34a, 34b gradually decreases from the inlet to the deflector 34 to its outlet to help center the glass gobs passing therethrough, as will be clear from a comparison of FIGS. 9 and 10.

The deflector 34 is preferably also formed from an aluminum alloy to aid in cooling the deflector 34, in which case its interior, glass gob contacting surfaces are also spray coated with an Ni—Gr composition, which will also, desirably, further reduce the coefficient of friction between the glass gobs and the deflector 34. Further, to accelerate the cooling of the deflector 34, at least a finite longitudinally extending portion of the deflector 34 is provided with spaced apart longitudinally extending slots 34c to define spaced apart, longitudinally extending cooling fins 34d.

The deflector 34 may be provided with the cover 36 to retain glass gobs passing through the deflector 34 when and if centrifugal force is insufficient to achieve such results. Heretofore, such covers were secured to the deflectors in fixed positions with respect thereto, which limited the size of the opening through which the glass gobs passed, often requiring replacement of deflectors and covers to accommodate manufacture of larger containers from larger gobs. To overcome this problem with prior art covered deflectors, the cover 36 is adjustably mounted with respect to the deflector 34 by threaded fasteners 38 and the outlet end of the cover 34 is spring biased away from the opening of the deflector 34 by compression springs 40 that are trapped between the deflector 34 and the cover 36, the inlet end of the cover 36 being curved outwardly from the adjacent portion of the deflector 34 to provide ample and adjustable clearance for the glass gobs passing therebetween to permit gobs of different size to pass therethrough without the need to change deflectors (and/or troughs). The cover 36 is preferably also formed from an aluminum alloy, in which case its interior, glass gob contacting surface is also spray coated with an Ni—Gr composition, and at least a finite, longitudinally extending portion of the cover 36 is preferably also provided with spaced apart, longitudinally extending slots 36c to define spaced apart, longitudinally extending cooling fins 36d to assist in cooling the cover 36 itself. If desired, a cover similar to the cover 36 can also be secured to the trough 32 for substantially all, or only a portion, of its length.

The use of the cover 36 also ensures that each glass gob will be traveling in a vertical direction as it exits the deflector 34, since the outlet end of the deflector 34 itself extends in a vertical direction. Although the best mode contemplated by the inventors for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

What is claimed is:

1. A deflector for conveying gobs of molten glass to an inlet to a blank mold of a glass container forming machine of the individual section type, said deflector comprising, in combination:

an elongate member, said elongate member being generally U-shaped in cross-section, said elongate member having a curved portion extending between an upper elevation near an inlet to the deflector to a lower elevation near an outlet from the deflector; and a cover, said cover being resiliently secured to said elongate member at a location near the outlet from said elongate member to provide a passage within said elongate member that is variable in depth.

2. A deflector according to claim 1 wherein said elongate member has a spaced apart pair of legs, the legs of said spaced apart pair of legs extending substantially parallel to one another.

3. A deflector according to claim 2 wherein said elongate member has a width between the spaced apart pair of legs that decreases gradually from a greater width near the inlet to the deflector to a lesser width near the outlet from the deflector.

4. A deflector according to claim 1, wherein said elongate member is formed from an aluminum alloy whose glass gob contacting surfaces are coated with a nickel-graphite composition.

5. A deflector according to claim 4 wherein said cover is formed from an aluminum alloy whose glass gob contacting surfaces are coated with a nickel-graphite composition.

* * * * *